United States Patent
Katano et al.

(10) Patent No.: US 8,135,991 B2
(45) Date of Patent: Mar. 13, 2012

(54) SEMICONDUCTOR DEVICE AND PROCESSING METHOD FOR STARTING THE SAME

(75) Inventors: Yoshito Katano, Tokyo (JP); Tadashi Yoshida, Kanagawa (JP); Kazuhiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/597,353

(22) PCT Filed: Jan. 27, 2005

(86) PCT No.: PCT/JP2005/001105
§ 371 (c)(1),
(2), (4) Date: Jul. 6, 2007

(87) PCT Pub. No.: WO2005/073850
PCT Pub. Date: Aug. 11, 2005

(65) Prior Publication Data
US 2008/0046637 A1    Feb. 21, 2008

(30) Foreign Application Priority Data
Jan. 28, 2004   (JP) .................................. 2004-019278

(51) Int. Cl.
*G06F 11/00* (2006.01)
(52) U.S. Cl. ............................................ 714/36; 714/37
(58) Field of Classification Search ................ 714/36, 714/37
See application file for complete search history.

(56) References Cited

U.S. PATENT DOCUMENTS

| | | | |
|---|---|---|---|
| 5,579,522 A * | 11/1996 | Christeson et al. ................ 713/2 |
| 6,018,806 A * | 1/2000 | Cortopassi et al. ............... 714/8 |
| 6,032,248 A * | 2/2000 | Curry et al. ...................... 712/37 |
| 6,311,213 B2 * | 10/2001 | Dawson et al. ................ 709/217 |
| 6,330,634 B1 * | 12/2001 | Fuse et al. ...................... 711/103 |
| 6,546,517 B1 | 4/2003 | Yoshimura |
| 6,587,915 B1 * | 7/2003 | Kim .............................. 711/103 |
| 7,178,061 B2 * | 2/2007 | Aasheim et al. ................ 714/24 |
| 2002/0073358 A1 * | 6/2002 | Atkinson ........................ 714/21 |

(Continued)

FOREIGN PATENT DOCUMENTS
EP       1300762       4/2003

(Continued)

OTHER PUBLICATIONS
International Search Report dated Mar. 1, 2005.

(Continued)

*Primary Examiner* — Yolanda L Wilson
(74) *Attorney, Agent, or Firm* — SNR Denton US LLP

(57) ABSTRACT

A flash memory is made to store a same boot program in a plurality of blocks in it. When a flash memory controller receives an access command for accessing the storage region storing the boot program from a CPU (Step S101), it outputs the read out data to the CPU only when the corresponding block is not faulty according to the determination (Steps S105, S106) made on the basis of the ECC contained in the data read out from the corresponding page and the determination (Step S109) made on the basis of the block information also contained in the data read out from the corresponding page. If, on the other hand it is determined that the block is faulty, the flash memory controller reads out the boot program stored in the next block (Steps S106, S103) and determines once again that the block is faulty or not faulty.

6 Claims, 4 Drawing Sheets

U.S. PATENT DOCUMENTS

| | | | |
|---|---|---|---|
| 2002/0184435 A1 * | 12/2002 | Lambino et al. | 711/103 |
| 2003/0005277 A1 * | 1/2003 | Harding et al. | 713/2 |
| 2004/0025002 A1 * | 2/2004 | Cepulis et al. | 713/2 |

FOREIGN PATENT DOCUMENTS

| | | | |
|---|---|---|---|
| EP | 1322100 | | 6/2003 |
| JP | 57-071508 | | 5/1982 |
| JP | 57071508 A | * | 5/1982 |
| JP | 05-151093 A | | 6/1993 |
| JP | 05-265767 | | 10/1993 |
| JP | 05265767 A | * | 10/1993 |
| JP | 07-098659 | | 4/1995 |
| JP | 10-011293 | | 1/1998 |
| JP | 10-333913 | | 12/1998 |
| JP | 2001-027953 | | 1/2001 |
| JP | 2002-074983 A | | 3/2002 |
| JP | 2002-149350 A | | 5/2002 |
| JP | 2003-109384 A | | 4/2003 |
| JP | 2003-271391 | | 9/2003 |
| JP | 2004-110086 | | 4/2004 |
| JP | 2004-318330 | | 11/2004 |
| WO | 2004-064111 | | 7/2004 |

OTHER PUBLICATIONS

EP Communication dated Jun. 6, 2008 for Application No. 200604823-5.

Japanese Patent Office, Office Action issued in Patent Application JP 2004-019278, on Oct. 27, 2009.

* cited by examiner

SEMICONDUCTOR DEVICE AND PROCESSING METHOD FOR STARTING THE SAME

TECHNICAL FIELD

This invention relates to a semiconductor device adapted to start operating by reading out a boot program from a data-rewritable nonvolatile memory and a processing method for starting the same. More particularly, the present invention relates to a semiconductor device adapted to start operating by reading out a boot program from a large capacity nonvolatile memory that cannot eliminate bad blocks in the manufacturing process such as a NAND type flash memory and a processing method for starting the same.

This application claims priority of Japanese Patent Application No. 2004-019278, filed on Jan. 28, 2004, the entirety of which is incorporated by reference herein.

BACKGROUND ART

System LSIs (large scale integrated circuits) having a structure of integrating a large number of functional features on a single chip have been used in appliances of various types such as home use portable appliances in recent years. A system LSI is equipped internally or externally with a nonvolatile memory storing a boot program and other various processing programs along with data. Such a nonvolatile memory is more often than not a flash memory that allows the data it stores to be electrically rewritten.

NOR type flash memories are generally being used to store a boot program. However, there has recently been arising a demand for NAND type flash memories that are less expensive in terms of the cost per bit.

Known boot systems utilizing a NAND type flash memory include those comprising a CPU (central processing unit) core, a system memory, a NAND type flash memory and an interface for data communications between each of the memories and the CPU core and adapted to operate for system booting by temporarily storing a boot code from the NAND type flash memory in the RAM (random access memory) by way of the interface under the control of the CPU core and reading out the boot code from the RAM in order to improve the performance of the system. Known boot systems of the sorts are disclosed in Japanese Patent Application Laid-Open Publication No. 2003-271391.

Meanwhile, in a flash memory, the operation of writing or reading data is conducted on a block by block basis. However, it has been known that bad blocks appear randomly in the manufacturing process in NAND type flash memories. On the other hand, it is necessary for booting using a NAND type flash memory to be ensured that the block storing the boot program is not faulty and the program is stored properly. However, it has been a problem to ensure that a NAND type flash memory has not any specific bad block because the cost of the test that needs to be conducted for that purpose before shipment is enormous.

SUMMARY OF THE INVENTION

In view of the above identified circumstances, it is therefore an object of the present invention to provide a semiconductor device that can start operating constantly stably if a flash memory of a relatively low cost per bit such as a NAND type flash memory is used as boot device.

Another object of the present invention is to provide a processing method for starting a semiconductor device that can start a semiconductor device constantly stably if a flash memory of a relatively low cost per bit such as a NAND type flash memory is used as boot device.

In an aspect of the invention, the first object is achieved by providing a semiconductor device adapted to start by reading out a boot program from a data-rewritable nonvolatile memory, the boot program being stored in a plurality of blocks in the nonvolatile memory in parallel, the semiconductor device including: a CPU adapted to specify a read position for reading out the boot program stored in the nonvolatile memory at the starting time, and execute a starting process according to the read out program; and a read control circuit adapted to determine that a block corresponding to the read position is faulty or not according to data read out from the block, output the data to the CPU if the block is determined as not faulty, and read the data from another block storing the boot program and determine again whether the another block is faulty or not if the block is determined as faulty.

Thus, in a semiconductor device according to the invention, the read control circuit reads out data from one of the blocks of a nonvolatile memory that store a same boot program in parallel with other blocks. Then, the read control circuit determines that the block from which the data is read out is faulty or not faulty according to the read out data typically on the basis of an error correction information or a block state information contained in the read out data.

If it is determined that the block is not faulty, the read control circuit outputs the read out data to the CPU. Then, as a result, the boot program is sequentially input to and executed by the CPU to start the semiconductor device to operate. If, on the other hand, it is determined that the block is faulty, the read control circuit reads out the data from some other block in the nonvolatile memory that also stores the boot program and determines once again if the block from which the data is read out is faulty or not.

As such a read control circuit is mounted in a semiconductor device, a situation where an incorrect boot code stored in a bad block is executed by the CPU is avoided if a large capacity nonvolatile memory is used and the nonvolatile memory randomly contains bad blocks. Thus, it is possible to constantly stably execute a starting process if a nonvolatile memory of relatively low manufacturing cost is used.

In another aspect of the invention, the second object is achieved by providing a processing method for starting a semiconductor device comprising a CPU adapted to start by reading out a boot program from a data-rewritable nonvolatile memory, the boot program being stored in a plurality of blocks in the nonvolatile memory in parallel, the processing method including the steps of: reading out data from a block in the nonvolatile memory corresponding to a read position specified by the CPU at the starting time by means of the read control circuit of the nonvolatile memory; and determining that the block is faulty or not according to the data read out from the block, outputting the data to the CPU if the block is determined as not faulty, and reading data from another block storing the boot program and determining again whether the another block is faulty or not if the block is determined as faulty.

Thus, with a processing method for starting a semiconductor device according to the invention, data is read out from one of the blocks of a nonvolatile memory that store in advance a same boot program in parallel with other blocks by the read control circuit. Then, it is determined that the block from which the data is read out is faulty or not faulty according to the read out data typically on the basis of an error correction information or a block state information contained in the read out data.

If it is determined that the block is not faulty, read out data is output to the CPU. Then, as a result, the boot program is sequentially input to and executed by the CPU to start the semiconductor device to operate. If, on the other hand, it is determined that the block is faulty, the data is read out from some other block in the nonvolatile memory that also stores the boot program to determine once again that the block from which the data is read out is faulty or not faulty.

As such a processing operation is carried out by the read control circuit, a situation where an incorrect boot code stored in a bad block is executed by the CPU is avoided if a large capacity nonvolatile memory is used and the nonvolatile memory randomly contains bad blocks. Thus, it is possible to constantly stably execute a starting process if a nonvolatile memory of relatively low manufacturing cost is used.

Thus, according to the invention, it is possible to ensure that a nonvolatile memory has not any specific bad block that stores a boot program without relying on the test before shipment. Therefore, it is possible to constantly stably start a semiconductor device according to the boot code stored in a large capacity nonvolatile memory of low manufacturing cost.

BEST MODE FOR CARRYING OUT THE INVENTION

Now, the present invention will be described in greater detail by referring to the accompanying drawings that illustrate a preferred embodiment of the invention.

Figure 1:
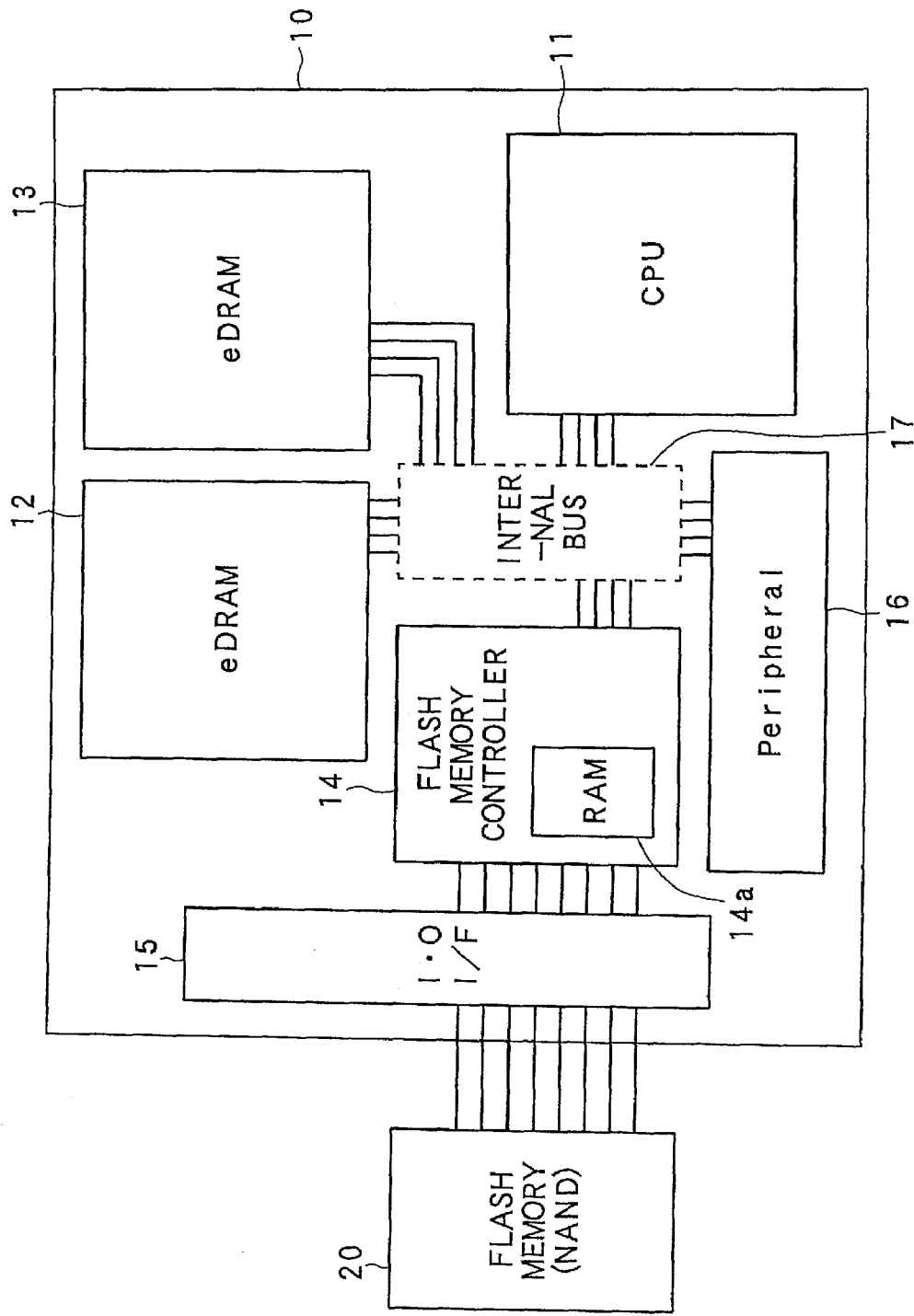
FIG. 1 is a schematic block diagram showing a configuration of semiconductor device according to an embodiment of the invention.

FIG. 1 is a schematic block diagram of the embodiment of semiconductor device according to the invention.

The semiconductor device illustrated in FIG. 1 comprises a system LSI 10 formed by integrally mounting various circuit on a single semiconductor chip and a NAND type flash memory 20 arranged outside the system LSI 10.

The system LSI 10 by turn comprises a CPU 11, eDRAM (embedded dynamic random access memories) 12 and 13, a flash memory controller 14, an input/output (I•O) I/F (interface) 15, other peripheral circuits 16 and an internal bus 17.

The CPU 11 is connected to the eDRAMs 12 and 13, the flash memory controller 14 and the peripheral circuits 16 by way of the internal bus 17. The CPU 11 comprehensively controls the operation of the entire semiconductor device by executing a processing program stored in the flash memory 20. The eDRAMs 12 and 13 temporarily store the processing program to be executed by the CPU 11 and the data to be used for the processing operation.

The flash memory controller 14 is a circuit for controlling the operation of reading an externally arranged flash memory 20. It is equipped in the inside thereof with a RAM 14a. As a read address is specified by the CPU 11, the flash memory controller 14 reads out data from the flash memory 20 and temporarily stores it in the RAM 14a before it supplies the data to the CPU 11. The flash memory controller 14 also has a function of executing an error correcting process according to the ECC (error correcting code) contained in the data stored in the RAM 14a.

Additionally, when the boot program stored in the flash memory 20 is accessed by the CPU 11, the flash memory controller 14 temporarily stores the data read out from the flash memory 20 and then determines that the block in the flash memory 20 from which the data is read out is faulty or not faulty. Subsequently, it supplies the data to the CPU 11 only when it is determined that the block is not faulty.

The input/output I/F 15 is an I/F circuit for exchanging data between the flash memory controller 14 and the flash memory 20.

The flash memory 20 stores various processing programs including the boot program for starting the semiconductor device and data. The processing programs are executed by the CPU 11.

The internal bus 17 includes a bus for transmitting bus state signal READY that indicates if the internal bus 17 is ready for use for accessing. For example, when the CPU 11 requests the flash memory controller 14 to read data from the flash memory 20, the host system is blocked against accessing the internal bus 17 if the bus state signal READY is negated by the flash memory controller 14.

The flash memory 20 stores a boot program in advance for the semiconductor device. When starting the semiconductor device, the CPU 11 specifies the leading address of the block that stores the boot program to the flash memory controller 14 and executes the boot program read out from the flash memory 20. As a result, the various parts of the semiconductor device are initialized.

Meanwhile, it is known that bad blocks randomly appear in NAND type flash memories. Such flash memories have a large memory capacity but are less expensive if compared with NOR type flash memories. On the other hand, in order to constantly stably start a semiconductor device, it is necessary that the boot program stored in the flash memory 20 is supplied to and executed by the CPU always in a normal state.

For this purpose, in this embodiment of the present invention, a same boot program is stored in parallel in a plurality of blocks in the flash memory 20. Then, the flash memory controller 14 determines that the block from which data is read out from the flash memory 20 is faulty or not faulty according to the read out data and, if it is determined that the block is faulty, the boot program is read out once again from some other block also storing the boot program. With this process, it is possible for the CPU 11 to always execute the boot program stored in a normal block.

In this embodiment, the flash memory controller 14 determines that the block is faulty or not faulty according to the ECC or the block information contained in the data read out from the flash memory 20.

Figure 2:
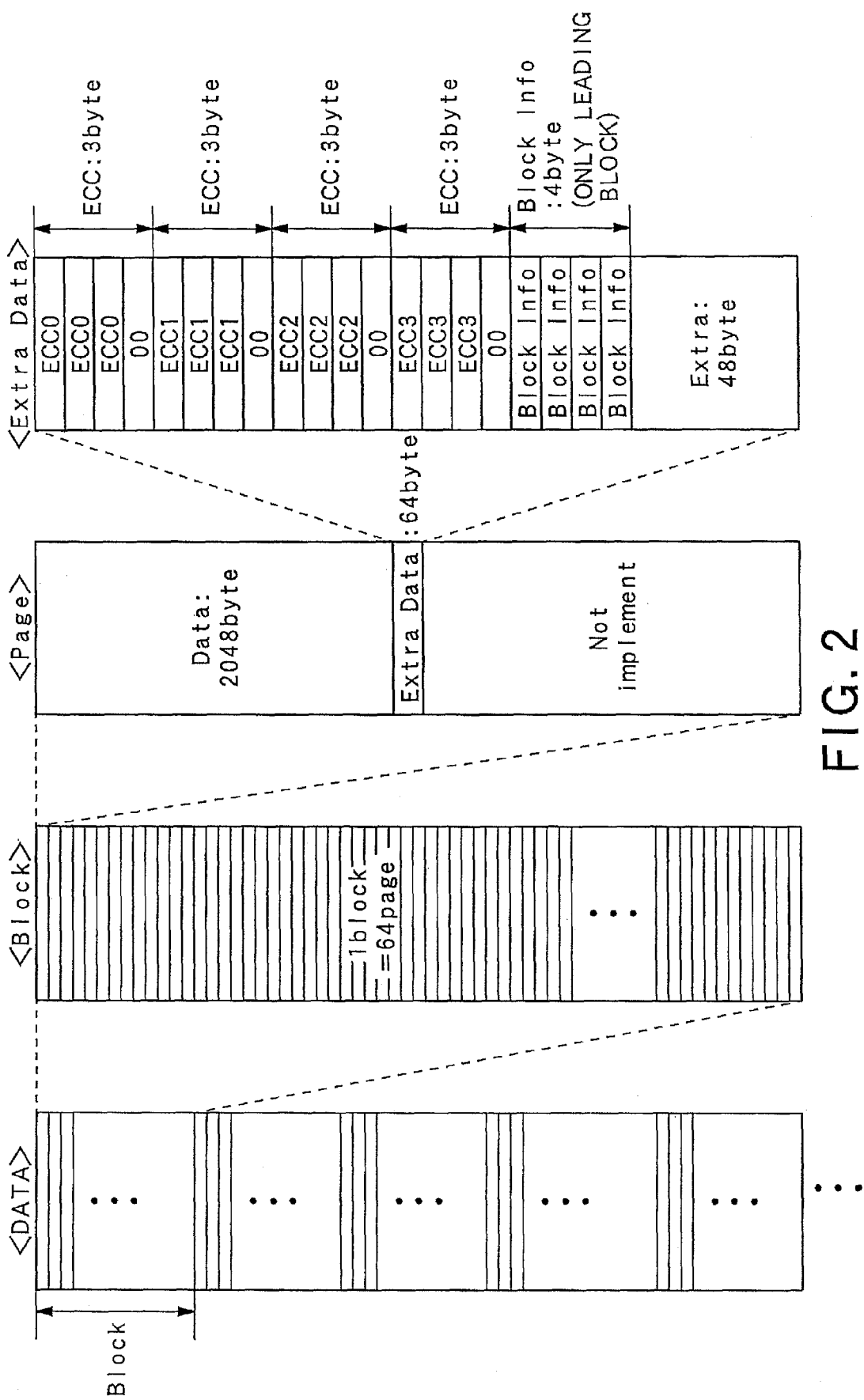
FIG. 2 is a schematic illustration of an exemplary data structure of a flash memory.

FIG. 2 is a schematic illustration of an exemplary data structure of the flash memory 20.

As shown in FIG. 2, the inside of the flash memory 20 is divided into a plurality of blocks and data is read out on a block by block basis. Each block is further divided into a plurality of pages. In this embodiment, a block is divided into 64 pages. A storage region for a total of 2,048 bytes from the top is typically assigned as storage area for user data and an extended data (extra data) region for 64 bytes is arranged after the storage region.

The ECC is divided into four parts of 3 bytes and stored in four regions of the extended data region from the top thereof.

"00" is inserted to the bottom of each of the regions. Block information is stored in the next region of 4 bytes in the leading page of each block. Block information is a flag to indicate if the block is faulty or not. It is possible to say that the block is normal when the value of the flag shows a specific value.

Figure 3:
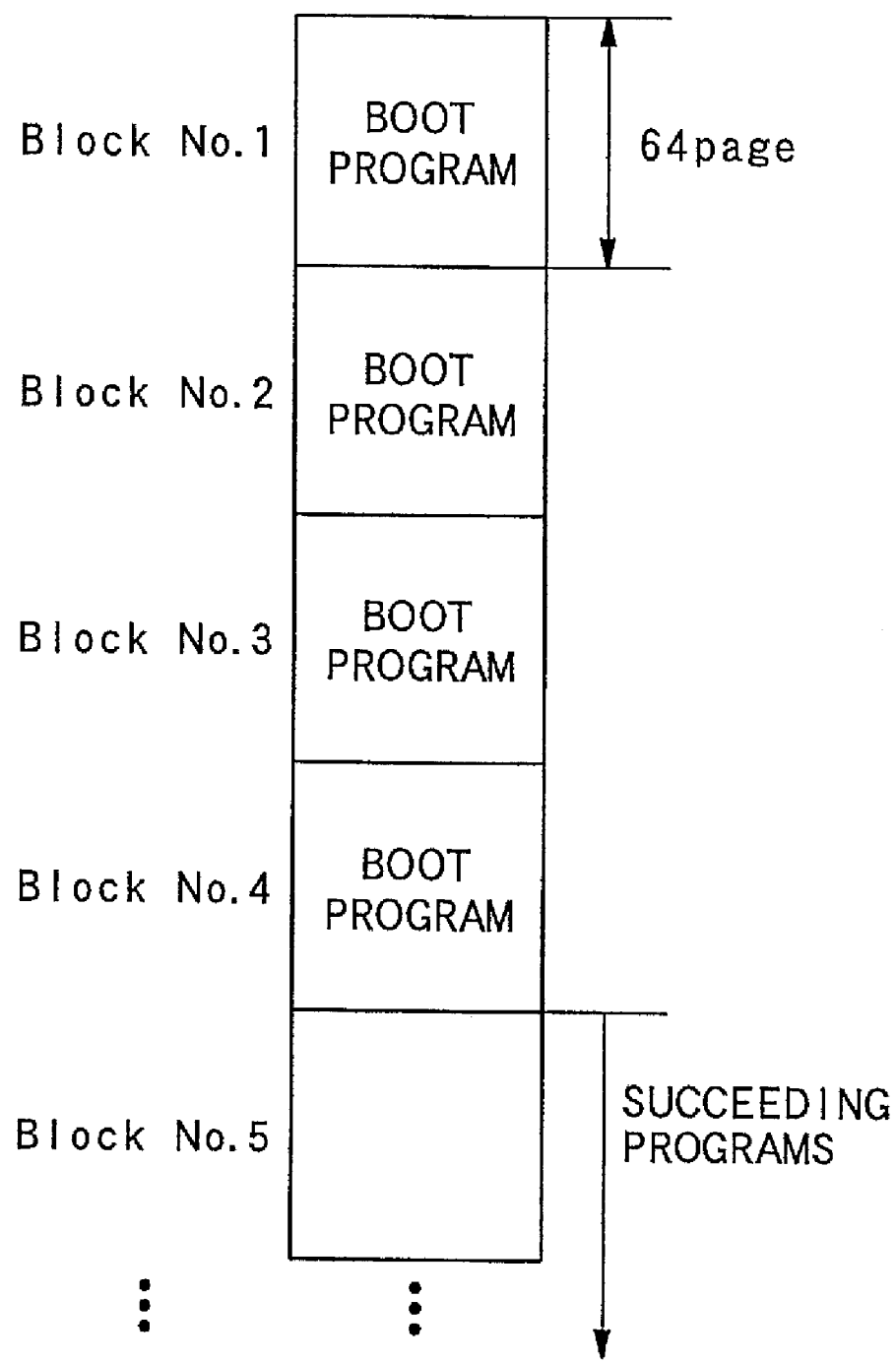
FIG. 3 is a schematic illustration of the state of storage of a boot program in a flash memory.

FIG. 3 is a schematic illustration of the state of storage of the boot program in the flash memory 20.

As shown in FIG. 3, in this embodiment, a same boot program is stored in the leading four blocks of the flash memory 20 and other processing programs and data are stored in the blocks that follow. Of the leading four blocks, the first leading block is specified by the CPU 11 immediately after resetting. If this block is determined to be faulty, the flash memory controller 14 sequentially specifies the second block, the third block and the fourth block to read the boot program.

Figure 4:
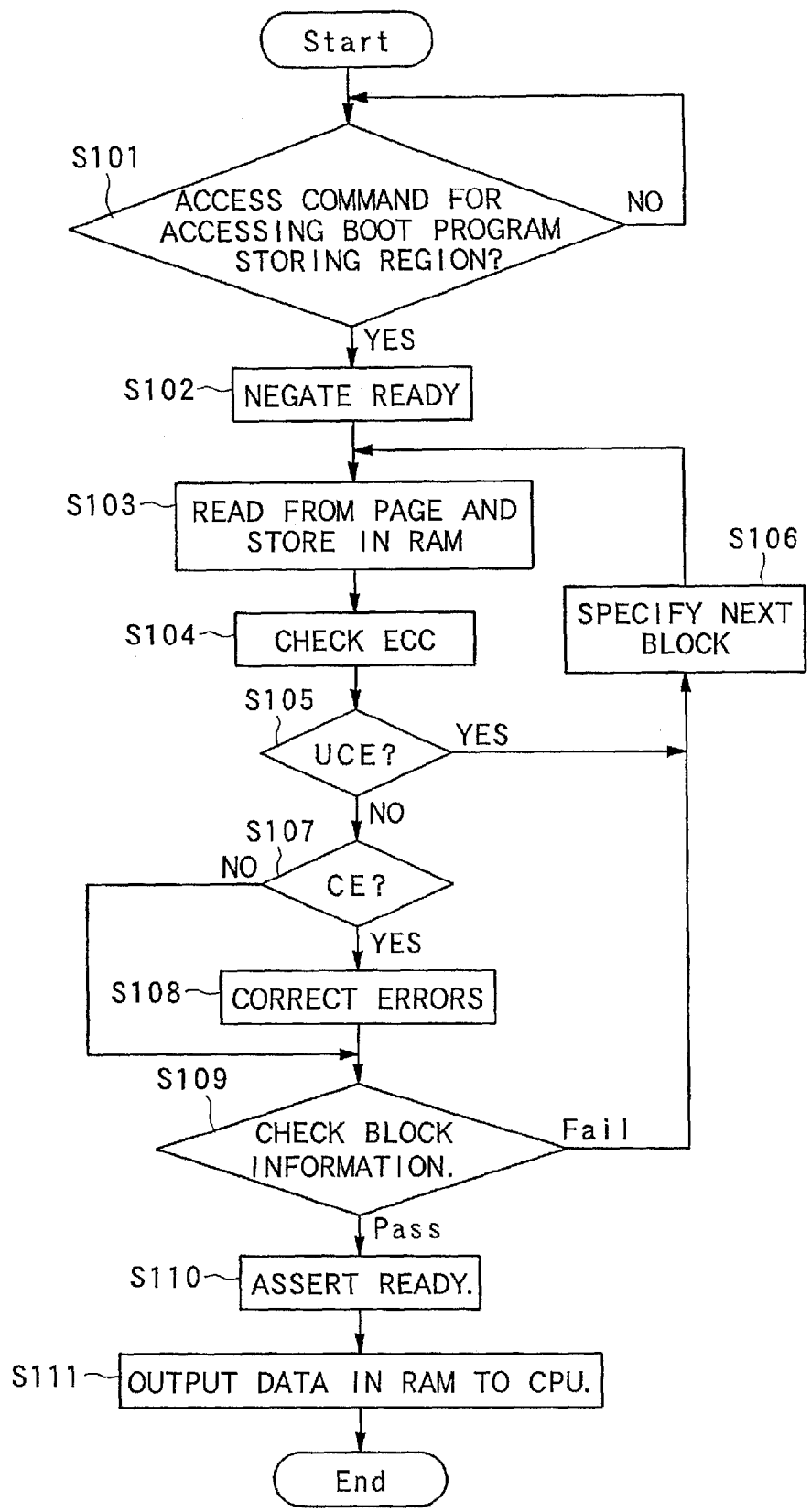
FIG. 4 is a flow chart of the processing operation of a flash memory controller for starting the semiconductor device according to the embodiment of the invention.

FIG. 4 is a flow chart of the processing operation of the flash memory controller 14 for starting the above described semiconductor device.

[Step S101] As a system reset signal is input, the CPU 11 accesses the storage region of the flash memory 20 that stores the boot program by way of the internal bus 17. The flash memory controller 14 waits for an access command from the CPU 11 and, when it actually receives an access command, it accesses the storage region (more specifically the leading page of the leading block), the flash memory controller 14 proceeds to Step S102.

[Step S102] The flash memory controller 14 negates the bus state signal READY. As a result, any attempt of the host system trying to access the internal bus 17 is blocked.

[Step S103] The flash memory controller 14 accesses the flash memory 20 by way of the input/output I/F 15 and reads the data of a page from the storage region specified by the CPU 11. Then, it temporarily stores the data it has read out in the RAM 14a. If some data is already stored in the RAM 14a at this time, the flash memory controller 14 overwrites the data.

[Step S104] The flash memory controller 14 sequentially reads out the data stored in the RAM 14a. Firstly, it checks the ECC and makes a determination of Step S105 and then that of Step S107 as will be described below.

[Step S105] If the flash memory controller 14 determines that the data of the page contains an uncorrectable error (UCE), it proceeds to Step S106. Otherwise, it proceeds to Step S107.

[Step S106] The flash memory controller 14 specifies the next block in the flash memory 20 from which data is to be read out and returns to Step S103. As a result, the data in the next block is read out again from the leading page of the block.

Since the boot program is stored in four blocks of the flash memory 20 in this embodiment, the processing operation is terminated when it proceeds to Step S106 four times. Then, the semiconductor device is not started.

[Step S107] If, on the other hand, the flash memory controller 14 determines that the data of the page contains one or more than one correctable errors (CE), it proceeds to Step S108. Otherwise, or when it determines that the data of the page does not contain any error, it proceeds to Step S109.

[Step S108] The flash memory controller 14 executes an error correction process on the data of the page and writes the corrected data on the RAM 14a.

[Step S109] The flash memory controller 14 extracts block information from the data of the RAM 14a. If the block information does not show a predetermined value, it determines that the block is a bad block and proceeds to Step S106.

As a result, the data is read out from the leading page of the next block once again. If, on the other hand, the block information shows a predetermined value, it determines that the block is a normal block and proceeds to Step S110.

[Step S110] The flash memory controller 14 asserts the bus state signal READY.

[Step S111] The flash memory controller 14 outputs the data in the RAM 14a to the CPU 11 by way of the internal bus 17. As a result, the boot program read out from the flash memory 20 is executed by the CPU 11 and the semiconductor device is started.

Note that the above flow chart applies to a process when the volume of the boot program is not larger than the capacity of the data storage region of a page. If the boot program is stored over a plurality of pages, the processing operation of Step S109 is carried out only when the boot program is read out from the leading page of the block. If the flash memory controller 14 determines that the block is a normal as a result of the above process, it outputs the data in the RAM 14a to the CPU 11 by way of the Steps S110 and S111 and then returns to Step S102 to negate the bus state signal READY. Then, the flash memory controller 14 reads the data of the next page in Step S103.

As a result of the process described above by referring to the flow chart of FIG. 4, the flash memory controller 14 outputs the data it reads out from the flash memory 20 to the CPU 11 only when the data contains one or more than one correctable errors or when the data does not contain any error and the block from which the data is read out is detected to be other than a bad block according to the block information. Thus, the CPU 11 can always execute a normal boot program when starting the semiconductor device. In other words, it is possible to constantly stably start the semiconductor device.

Therefore, due to the process executed by the flash memory controller 14, it is possible to ensure that the specific block of the flash memory 20 that stores the boot program is not faulty. Conventionally, it has been a problem to ensure that a NAND type flash memory has not any specific bad block because the cost of the test that needs to be conducted for that purpose before shipment is enormous and the yield of manufacturing such flash memories is inevitably reduced by the test. However, according to the invention, it is possible to use a low cost high capacity flash memory as boot device if bad blocks randomly exist therein. Thus, it is possible to constantly stably start such a memory while suppressing the cost of manufacturing the entire semiconductor device.

If the block from which the boot program is to be read out is determined to be faulty, the boot program is read out once again from some other block and output to CPU 11 by the flash memory controller 14 only it is determined that the block is not a bad block. Thus, the CPU 11 can execute the exactly same starting process after resetting and it is not necessary to alter the configuration of the components other than the flash memory controller 14. In other words, the present invention makes a computer system adapted to execute various processes by means of a CPU find a broad scope of application without raising the manufacturing cost.

While the flash memory is arranged outside the system LSI in the above described embodiment, the present invention is also applicable to an arrangement where the flash memory is arranged inside the system LSI.

The flash memory that is used as boot device is not limited to a NAND type flash memory and a flash memory of any other type having a relatively large capacity and a configuration that allows it to be sequentially accessed from which it is difficult to completely eliminate bad blocks at the time of shipment may also be used for the purpose of the present invention. Such flash memories typically include those of the so-called AND type.

The invention claimed is:

1. An apparatus, said apparatus comprising:
a semiconductor device including a central processing unit (CPU) and a read control circuit (RCC);
a data-rewritable nonvolatile memory communicatively coupled to the CPU that includes a plurality of data blocks with each data block including a plurality of data pages,
wherein,
at least two boot program instructions are stored in a predetermined number of data blocks in parallel in the data-rewritable nonvolatile memory, the predetermined number being less than the total number of data blocks,
block state information indicating that a data block is faulty or not faulty is stored in a leading data page of each of the data blocks storing boot program instructions,
the CPU is configured, in part, to specify to the RCC a read position for reading out the boot program instruction from a data block in the data-rewritable nonvolatile memory at a starting time; and
the RCC is configured to (a) determine whether a first respective data block is faulty or not according to the block state information, (b) output first data to the CPU when the first respective data block is determined as not faulty, and (c) read, when the first respective data block is determined as faulty, second data from a second respective data block and output the second data to the CPU when the second respective data block is determined as not faulty, and
the RCC prevents the CPU from accessing the data-rewritable nonvolatile memory while the RCC determines which of the respective data blocks to output to the CPU.

2. The apparatus of claim 1, wherein the RCC is configured to determine whether a data block is faulty or not faulty at least according to an error correction code contained in data read out from the data-rewritable nonvolatile memory.

3. The apparatus of claim 2, wherein the RCC corrects the data and supplies the data to the CPU when the RCC determines that the data is correctable according to the error correction code but otherwise determines that the data block is faulty when it determines that the data is uncorrectable data.

4. The apparatus of claim 1, wherein the RCC is configured to determine that a data block is faulty or not faulty at least according to the block state information contained in data read out from the data-rewritable nonvolatile memory.

5. The apparatus of claim 4, wherein the RCC determines that the data block is faulty when the block state information does not show a predetermined value.

6. The apparatus of claim 1, wherein the data-rewritable nonvolatile memory is a NAND type flash memory.

* * * * *